United States Patent [19]
Cook

[11] 3,850,607
[45] Nov. 26, 1974

[54] SELF-ALIGNING SHEAR BLADE HOLDERS

[75] Inventor: John E. Cook, Toledo, Ohio

[73] Assignee: Owens-Illinois, Inc., Toledo, Ohio

[22] Filed: Nov. 30, 1970

[21] Appl. No.: 93,711

[52] U.S. Cl. .................................. 65/334, 65/133
[51] Int. Cl. ............................................. C03b 5/38
[58] Field of Search ............................ 65/133, 334

[56] References Cited
UNITED STATES PATENTS
1,953,030   3/1934   Sterrett ........................... 65/334 X
3,467,514   9/1969   McNamara ...................... 65/133 X
3,490,326   1/1970   McNamara ...................... 65/334 X Primary Examiner—S. Leon Bashore
Assistant Examiner—Frank W. Miga
Attorney, Agent, or Firm—Harold F. Mensing; Edward J. Holler

[57] ABSTRACT

A self-aligning glass gob shearing mechanism including a pair of interchangeable shear blade holding devices each permitting limited rotational movement to facilitate accurate alignment of the blades. A spring in each holding device resiliently retains the respective blades in their relative rotational positions.

11 Claims, 6 Drawing Figures

PATENTED NOV 26 1974      3,850,607
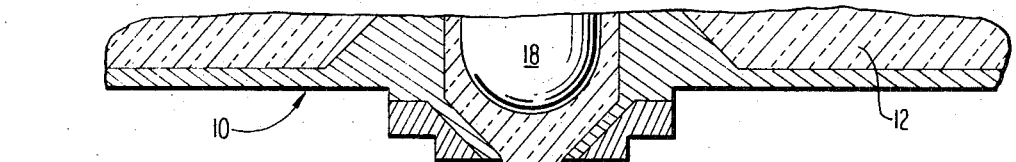
FIG. 1
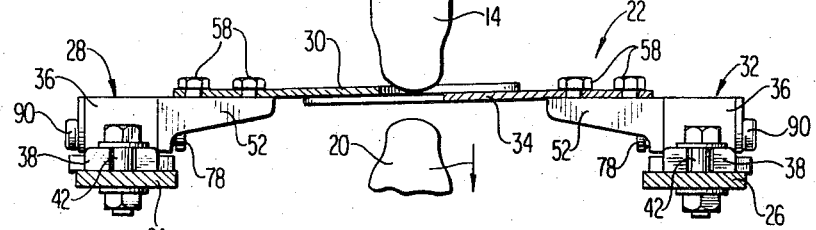
FIG. 2
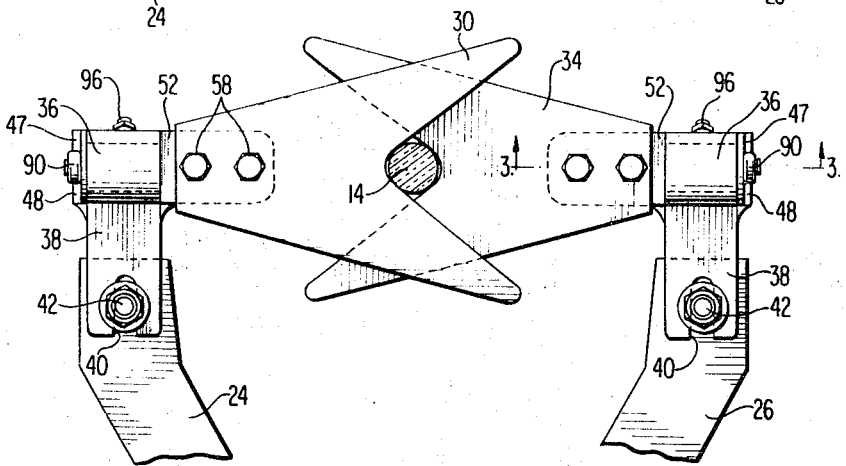
FIG. 3
FIG. 4
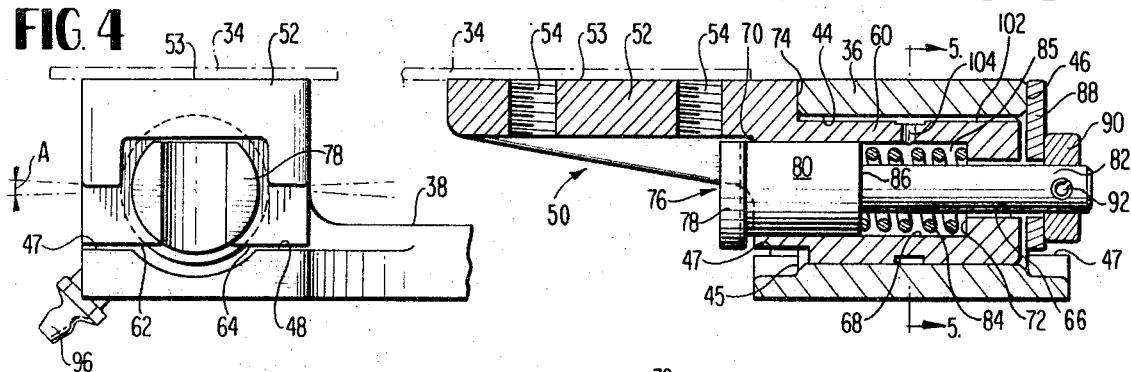
FIG. 5     FIG. 6
INVENTOR
JOHN E. COOK
BY Richard B. Pence &
E. J. Holler
ATTORNEYS

SELF-ALIGNING SHEAR BLADE HOLDERS

BACKGROUND OF THE INVENTION

1. Field of the Invention

This invention relates to glass gob shearing mechanisms, and more particularly to an improved shear blade mechanism including a pair of interchangeable shear blade holding devices each supporting one of a pair of cooperating shear blades for limited pivotal movement to facilitate alignment of the blades.

2. Description of the Prior Art

Glass shears of the general type with which this invention is concerned are employed to sever successive individual gobs of molten glass from a continuous stream of the glass dispensed from the bottom of the forehearth of a glass furnace by a conventional glass feeder. The gobs severed by the shears are permitted to fall, or are guided downwardly into individual molds or other glass forming devices to be formed, while still in the molten or soft state, into the desired configurations.

Accurate alignment and positioning of the cooperating shear blades is critical to the gob cutting operation to avoid or minimize the formation of objectionable shear marks on the cut gobs which may result in structural defects or blemishes in the articles ultimately formed from the glass. Numerous attempts have been made in the past to develop a gob shearing device which will accurately and reliably shear the gob of glass without leaving the objectional shear marks. One such prior art device is illustrated for example in U.S. Pat. No. 3,467,514 which discloses the concept of mounting one of the shearing blades for limited pivotal movement to provide for automatic alignment of the two shearing blades upon engagement with one another.

While the shearing device illustrated in the prior art patent, mentioned above, has met substantial commercial success, it has nevertheless not been entirely satisfactory for various reasons. For example, only one blade is supported for pivoted movement about the longitudinal axes of the blade, so that the left and right hand parts are not interchangeable. This necessarily makes the device both expensive both to manufacture originally and to maintain in operation. Also, the one pivoting blade is not held in position after the initial alignment and is free to hunt for alignment with the stationary blade at each shear stroke, thereby causing excessive and unnecessary wear to the blades.

SUMMARY OF THE INVENTION

The foregoing and other defects of the prior art are avoided by the glass gob shearing mechanism according to the present invention in which both left and right hand shearing blades are mounted for limited pivotal movement about their respective longitudinal axes to facilitate automatic alignment of the blades. A resilient spring element mounted within the blade holder resiliently holds the respective blades in an aligned position after the initial operation, thereby eliminating the objectionable hunting upon each operation of the device and the consequent wear resulting from repeated alignment shifting. Further, by employing identical mounting structure for both the left and right hand shearing blades, the parts become interchangeable with the consequent saving both in manufacturing and operational costs. In addition, the shear blade mounting structure according to the present invention can be employed on conventional shearing devices, employing commercially available shear blades having curved caming surfaces on their forward points to assure proper contact.

Accordingly, the primary object of the present invention is to provide a new and improved self-aligning glass gob cutting shear mechanism.

Another object of the present invention is to provide such an improved shear mechanism which employs interchangeable components mounting both left and right shearing blades.

Another object of the invention is to provide an improved glass gob cutting shear mechanism in which both the left and right hand shearing blades are supported for limited pivotal movement to facilitate alignment, and in which the respective blades are resiliently retained in their aligned position.

BRIEF DESCRIPTION OF THE DRAWINGS

Other features and advantages of the invention will become apparent from the detailed description of a preferred embodiment container herein, taken in conjunction with the drawings, in which:

FIG. 1 is a fragmentary sectional view illustrating the improved glass gob cutting shear mechanism according to the present invention employed to cut the gobs of glass fed from a conventional glass feeder;

FIG. 2 is a top plan view of the shear mechanism;

FIG. 3 is a sectional view taken on line 3—3 of FIG. 2;

FIG. 4 is an elevation view of the blade support mechanism shown in FIG. 3, as viewed from the left side thereof;

FIG. 5 is a sectional view taken along line 5—5 of FIG. 3; and

FIG. 6 is an elevation view similar to FIG. 4 and taken from the opposite side thereof.

DESCRIPTION OF THE PREFERRED EMBODIMENT

Referring now to the drawings in detail, a portion of the feeder forehearth section 10 of a conventional glass furnace containing a charge of molten glass 12 is illustrated in FIG. 1. The molten glass is illustrated as being fed in a continuous stream 14 from the orifice 16 by a conventional gob feeder structure typically employing an axially adjustable and rotatable plunger 18. Individual gobs 20 of the molten glass are severed successively from the lower end of the stream 14 by the shear mechanism of this invention which is indicated generally by the reference numeral 22.

As best seen in FIG. 2, the glass gob shear mechanism 22 comprises a pair of cooperating support arms 24, 26 supported for reciprocal pivotal movement in a horizontal plane toward and away from one another by a suitable drive mechanism, not shown. A shear blade mounting assembly 28 is mounted on the end of arm 24 and supports an upper shear blade 30. A second shear blade mounting mechanism 32 is mounted on the end of arm 26 and supports a lower shear blade 34. Since blade mounting assemblies 28 and 32 are identical in construction, and interchangeable one with the other, only mounting assembly 32 will be described in detail herein, it being understood that the description applies also to assembly 28. Also, like reference numerals will be applied to corresponding parts of both shear blade mounting assemblies 28 and 32.

The shear blade mounting assembly 32 comprises a mounting shank bearing 36 including an integrally formed mounting base 38 having an open elongated slot 40 formed therein for receiving a mounting bolt 42 to clamp the assembly on the arm 26. As illustrated in FIG. 3, mounting shank bearing 36 has a cylindrical bore 44 extending therethrough, with the base 38 extending laterally outwardly from the opposite ends 45, 46 of bore 44 to form a pair of shoulders, or stops 47, 48 directed upwardly from the base 38.

A shear blade mounting shank 50 is rotatably supported in the bore 44 of shank bearing 36. Mounting shank 50 includes a laterally projecting platform portion 52 having a horizontal upper surface 53 and pair of threaded openings 54, 56 extending therethrough for receiving a pair of bolts 58 to rigidly mount the shear blade 34 on surface 53. Mounting shank 50 also includes a cylindrical shaft portion 60 adapted to fit in the cylindrical bore 44 to rotatably support the mounting shank in the shank bearing 36. Rotation of the mounting shank about the axis of cylindrical shaft 60 is limited by a pair of shoulders 62, 64 adapted to engage the shoulders 47, 48 respectively.

A cylindrical bore 66 extends axially through shaft 60, and a counterbore 68 extends into the shaft from the end 70 thereof adjacent the platform 52 and terminates in a shoulder 72 positioned near the opposite end of the shaft. Platform 52 forms a shoulder, or stop 74 at its juncture with the shaft 60 for engaging the end 45 of mounting shank bearing 36 to limit movement of the blade mounting shank through the bearing.

To retain the mounting shank 50 within the shank bearing, a clamp pin 76 having an enlarged head 78 adapted to engage the end 70 of shaft 60 is positioned in and extends through the bore 66. Pin 76 has a first cylindrical portion 80 adapted to fit within counterbore 68, and a second, smaller cylindrical portion 82 adapted to extend through and project outwardly beyond the end of bore 66. Cylindrical portion 80 is substantially shorter than the counterbore 68, and a cylindrical compression spring 84 is mounted within the chamber 85 defined by the counterbore 68 between the shoulder 72 and the end wall 86 of cylinder 80 to normally urge clamp pin 76 out of the counterbore 68. To retain the clamp pin 76 within the bore 66, a retaining washer 88 is mounted on the end of cylindrical portion 82 and bears against the end 46 of shank bearing 36. A second, smaller washer 90 is mounted on the end of cylindrical portion 82 of clamp pin 76, and is retained thereon by a spring pin 92 extending through the washer and the outwardly projecting end of the clamp pin.

Referring now to FIGS. 3 and 5, it is seen that the mounting assembly may be lubricated through a suitable lubrication fitting 96 mounted in an opening 98 of the shank bearing to provide a passage for the lubrication into the bore 44. Shaft 60 has an annular groove 100 formed around its outer periphery, adjacent the center portion thereof, and an axially extending groove 102 extending the full length thereof to permit lubrication passing through opening 98 to flow freely around and along shaft 60 within bore 44. Also a radial opening 104 extending from groove 100 provides passage into the chamber 85 to provide lubrication for the clamp pin.

As illustrated in FIG. 4, when the shear blade 34 is positioned in a plane parallel to the plane of the base 38, the shoulder 62 will be spaced slightly from shoulder 47, and shoulder 64 will be equally spaced from shoulder 48. Thus, it is apparent that blade mounting shank 50, with the lower shear blade 34 mounted thereon, may rotate through a slight angle A about the horizontal axis of clamp pin 76, within the limits defined by the shoulders 47, 48 and 62, 64. This rotation will be resisted, however, by the frictional engagement of the shoulder 74 with the end 45 of the shank bearing 36 which functions substantially as a slip clutch as a result of the compression force in the spring 84 pushing against shoulder 72. Thus, the blade mounting shank and the blade carried thereby will tend to remain in their rotated position rather than to hunt or freely rotate about the axis of the clamp pin within the limits defined by the stops.

As is apparent from FIG. 3, the mounting shank bearing 36 is identical on opposed ends. Thus, the mounting shank 52 may readily be mounted in the bearing with shoulder 74 engaging either end 45 or 46 so that the structure described above may readily be employed either as a left or a right hand shear blade assembly by the simple expedient of reversing the mounting of the mounting shank in the bearing.

Since both the shear blades are permitted to rotate, within limits, a more accurate alignment is assured as the assembly is thus inherently capable of compensating for axial as well as rotational misalignment of the shear blades. This alignment compensation is not obtainable where only one blade is permitted to rotate about its longitudinal mounting axis.

While I have disclosed and described a preferred embodiment of my invention, I wish it understood that I do not intend to be restricted solely thereto, but rather that I do intend to include all embodiments thereof which would be apparent to one skilled in the art and which come within the spirit of the scope of my invention.

I claim:

1. In a shear mechanism for cutting gobs of glass from a stream of molten glass issuing from a furnace and including a pair of opposed cooperating shear blades mounted one each on the ends of a pair of operating arms supported for oscillating movement toward and away from one another to move the shear blades between an open position to permit the stream of molten glass to flow therebetween and a closed position in overlaying contacting relation to shear a gob of glass from the stream, the improvement which comprises a pair of blade mounting assemblies each supporting one of said blades on its associated operating arm by means of a fixed bearing with a blade support pivotally mounted on said bearing for limited pivotal movement about a generally horizontal axis extending below and in the general direction of movement of the respective blades upon movement of said operating arms, each mounting means having friction means type alignment retaining means providing limited frictional resistance to said pivotal movement, which frictional resistance tends to retain said shear blades in their respective adjusted alignment positions after initial contact with one another establishing such alignment and whereby each of said blades may rotate a limited amount upon contact with one another to facilitate accurate alignment said friction means includes first shoulder means on said fixed bearing and second shoulder means on said blade support, and spring means urging said first and said second shoulder means into friction contact with one another.

2. In a shear mechanism as defined in claim 1, the further improvement wherein said blade mounting assemblies are each made up of identical component parts.

3. In a shear mechanism as defined in claim 1, the further improvement comprising stop means on said fixed bearing and on said blade support positioned to engage one another upon predetermined rotational movement of said blade support in either direction in said bearing to thereby limit rotational movement of said shear blades.

4. In a shear mechanism for cutting gobs of glass from a stream of molten glass issuing from a furnace and including a pair of opposed cooperating shear blades mounted one each on the ends of a pair of operating arms supported for oscillation toward and away from one another to move the shear blades between an open position spaced from one another to permit the stream of molten glass to flow therebetween and a closed position in overlaying contacting relation to shear a gob of glass from the stream, the improvement which comprises a pair of blade mounting assemblies each supporting one of said blades on its associated operating arm for limited pivotal movement about a generally horizontal axis extending below and in the general direction of movement of the respective blades upon movement of said operating arms, said blade mounting means each including a fixed bearing, means mounting said fixed bearing on its associated operating arm, a blade support including a shaft journaled in said bearing for rotation about said axis, a cylindrical bore extending through said shaft, pin means mounted in said cylindrical bore, retaining means engaging said pin means and said fixed bearing retaining said shaft in said bearing, and a means providing limited frictional contact between said bearing means and said blade mounting means providing limited resistance to relative rotation therebetween.

5. In a shear mechanism as defined in claim 4, the further improvement wherein said means providing limited frictional contact comprises first shoulder means on said fixed bearing and second shoulder means on said blade support, and spring means urging said first and said second shoulder means into frictional contact with one another.

6. A shear mechanism as defined in claim 5 wherein said spring means comprises a coil spring mounted on and surrounding a portion of said pin means, said coil spring being positioned within a counterbore in said shaft.

7. A shear mechanism as defined in claim 6 wherein said blade mounting means are each made up of identical component parts.

8. In a shear mechanism for cutting gobs of glass from a stream of molten glass issuing from a furnace and including a pair of opposed cooperating shear blades mounted one each on the ends of a pair of operating arms supported for oscillating movement toward and away from one another to move the shear blades between an open position to permit the stream of molten glass to flow therebetween and a closed position in overlaying contacting relation to shear a gob of glass from the stream, the improvement which comprises a pair of blade mounting assemblies each supporting one of said blades on its associated operating arm for limited pivotal movement about a generally horizontal axis extending below and in the general direction of movement of the respective blades upon movement of said operating arms, each mounting means having alignment retaining means providing limited frictional resistance to said pivotal movement, which frictional resistance tends to retain said shear blades in their respective adjusted alignment positions after initial contact with one another establishing such alignment and whereby each of said blades may rotate a limited amount upon contact with one another to facilitate accurate alignment.

9. A shear mechanism for successively cutting gobs of glass from the end of a vertically flowing stream of molten glass including a pair of cooperating shear blades mounted one each on the ends of a pair of operating arms supported for oscillation in horizontal paths toward and away from one another to move the shear blades between an open position spaced from one another to permit the stream of molten glass to flow therebetween and a closed position in overlaying contacting relation to shear a gob of glass from the stream, the improvement comprising: means for rotatably mounting at least one of said blades for limited angular rotation about a horizontal axis and slip clutch means for preventing free rotation of said blade about said axis, said clutch means includes a resilient means disposed about said axis, said resilient means is a coil spring.

10. In a shear mechanism for succesively cutting gobs of glass from the end of a vertically flowing stream of molten glass including a pair of cooperating shear blades mounted one each on the ends of a pair of operating arms supported for oscillation in horizontal paths toward and away from one another to move the shear blades between an open position spaced from one another to permit the stream of molten glass to flow therebetween and a closed position in overlaying contacting relation to shear a gob of glass from the stream, the improvement comprising: means for rotatably mounting both of said blades for limited angular rotation about horizontal axes and slip clutch means for preventing free rotation of both of said blades about said axes.

11. In a shear mechanism for successively cutting gobs of glass from the end of a vertically flowing stream of molten glass including a pair of cooperating shear blades mounted one each on the ends of a pair of operating arms supported for oscillation in horizontal paths toward and away from one another to move the shear blades between an open position spaced from one another to permit the stream of molten glass to flow therebetween and a closed position in overlaying contacting relation to shear a gob of glass from the stream, the improvement comprising: means for rotatably mounting at least one of said blades on the end of its respective arm, said means including a bearing member, a horizontally disposed shaft member journalled in said bearing member a concentric bore in said shaft member, a radially inwardly disposed shoulder at one end of said bore, a shouldered cylindrical pin extending concentrically through said bore, a retainer on one end of said pin for holding said pin in a fixed axial position with respect to said bearing member and a coil spring in said bore around said pin, positive stop means for limiting the degree of angular movement of one of said members relative to the other and spring means for biasing a surface on said bearing member into frictional contact with a surface on said shaft member to prevent the free rotation of said members relative to each other.

* * * * *